United States Patent [19]
Fleming

[11] Patent Number: 6,062,267
[45] Date of Patent: May 16, 2000

[54] TELESCOPIC CONDUIT PASSAGE ASSEMBLY

[76] Inventor: Karl Fleming, 18122 16th St. East, Sumner, Wash. 98390

[21] Appl. No.: 09/282,939

[22] Filed: Apr. 1, 1999

[51] Int. Cl.[7] ................................................. F16L 9/18
[52] U.S. Cl. ......................... 138/114; 138/155; 138/110; 138/111; 174/48
[58] Field of Search ................................... 138/114, 110, 138/108, 220, 155; 174/48

[56] References Cited

U.S. PATENT DOCUMENTS

| | | | |
|---|---|---|---|
| D. 285,044 | 12/1986 | Mockett | D8/354 |
| 3,542,940 | 11/1970 | Flachbarth et al. | 174/48 X |
| 4,163,572 | 8/1979 | Benscoter | 174/48 X |
| 4,354,052 | 10/1982 | Albany et al. | 174/48 |
| 4,924,646 | 5/1990 | Marquardt | 174/48 |
| 5,560,397 | 10/1996 | Miller et al. | 138/110 |
| 5,594,201 | 1/1997 | Reinert, Sr. | 174/37 |
| 5,799,702 | 9/1998 | Hsien-Jen et al. | 138/114 X |

*Primary Examiner*—Patrick Brinson

[57] ABSTRACT

A telescopic conduit passage assembly for extending conduit, such as electrical wiring, through a hole in an exterior wall of a structure. The telescopic conduit passage assembly includes a main tube and an extension tube each having a pair of opposite open ends. A first of the ends of the extension tube is slidably inserted into a first of the ends of the main tube. The main tube and the extension tube each have an outwardly radiating end flange adjacent a second of the ends of the respective tube.

12 Claims, 2 Drawing Sheets

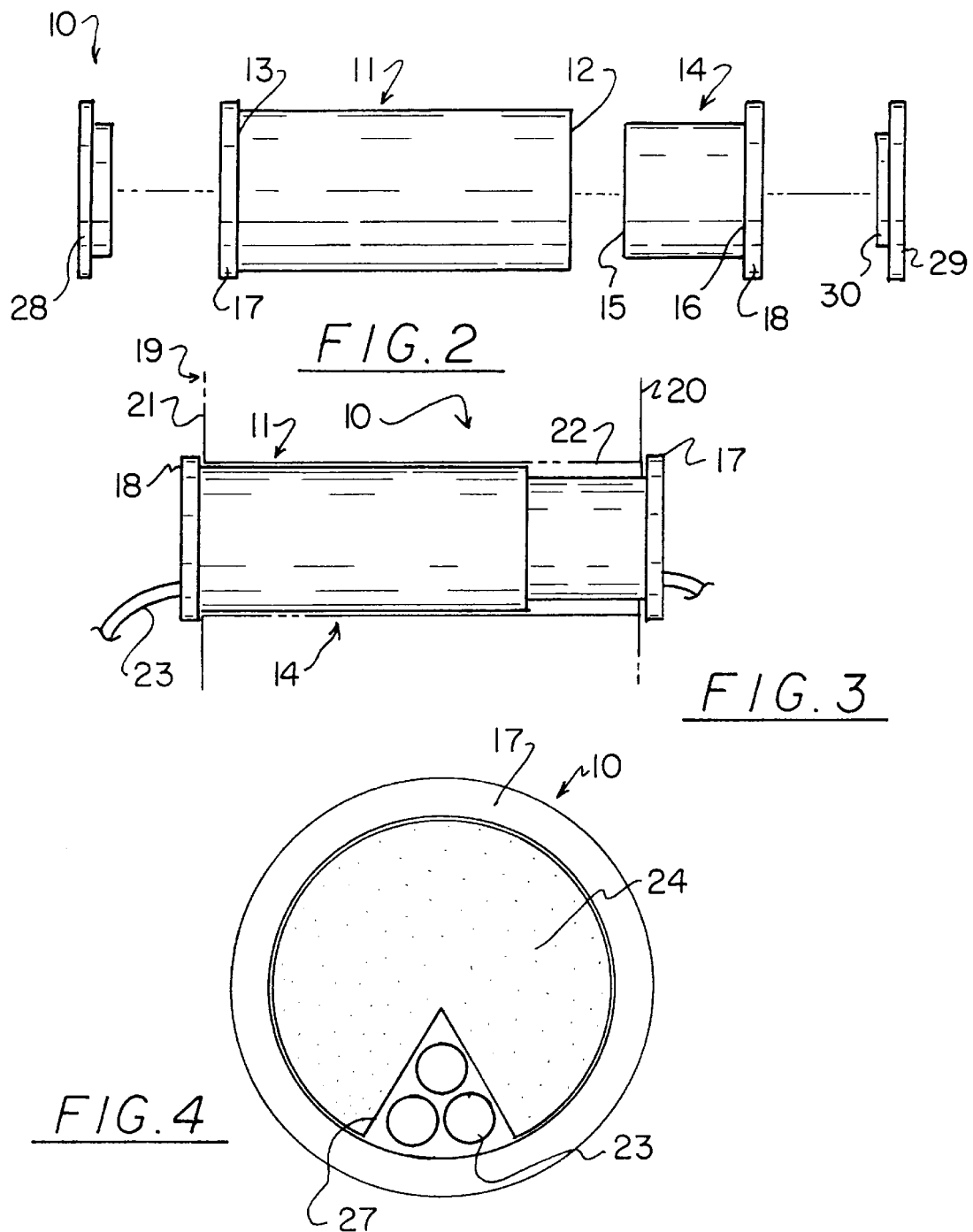

TELESCOPIC CONDUIT PASSAGE ASSEMBLY

BACKGROUND OF THE INVENTION

1. Field of the Invention

The present invention relates to conduit passage assemblies and more particularly pertains to a new telescopic conduit passage assembly for extending conduit, such as electrical wiring, through a hole in an exterior wall of a structure.

2. Description of the Prior Art

The use of conduit passage assemblies is known in the prior art. More specifically, conduit passage assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,079,389; 5,560,397; Des. 285,044; 3,855,413; 4,924,646; and 1,905,794.

While these devices fulfill their respective, particular objectives and requirements, the aforementioned patents do not disclose a new telescopic conduit passage assembly. The inventive device includes a main tube and an extension tube each having a pair of opposite open ends. A first of the ends of the extension tube is slidably inserted into a first of the ends of the main tube. The main tube and the extension tube each have an outwardly radiating end flange adjacent a second of the ends of the respective tube.

In these respects, the telescopic conduit passage assembly according to the present invention substantially departs from the conventional concepts and designs of the prior art, and in so doing provides an apparatus primarily developed for the purpose of extending conduit, such as electrical wiring, through a hole in an exterior wall of a structure.

SUMMARY OF THE INVENTION

In view of the foregoing disadvantages inherent in the known types of conduit passage assemblies now present in the prior art, the present invention provides a new telescopic conduit passage assembly construction wherein the same can be utilized for extending conduit, such as electrical wiring, through a hole in an exterior wall of a structure.

The general purpose of the present invention, which will be described subsequently in greater detail, is to provide a new telescopic conduit passage assembly apparatus and method which has many of the advantages of the conduit passage assemblies mentioned heretofore and many novel features that result in a new telescopic conduit passage assembly which is not anticipated, rendered obvious, suggested, or even implied by any of the prior art conduit passage assemblies, either alone or in any combination thereof.

To attain this, the present invention generally comprises a main tube and an extension tube each having a pair of opposite open ends. A first of the ends of the extension tube is slidably inserted into a first of the ends of the main tube. The main tube and the extension tube each have an outwardly radiating end flange adjacent a second of the ends of the respective tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telescopic conduit passage assembly apparatus and method which has many of the advantages of the conduit passage assemblies mentioned heretofore and many novel features that result in a new telescopic conduit passage assembly which is not anticipated, rendered obvious, suggested, or even implied by any of the prior art conduit passage assemblies, either alone or in any combination thereof.

It is another object of the present invention to provide a new telescopic conduit passage assembly which may be easily and efficiently manufactured and marketed.

It is a further object of the present invention to provide a new telescopic conduit passage assembly which is of a durable and reliable construction.

An even further object of the present invention is to provide a new telescopic conduit passage assembly which is susceptible of a low cost of manufacture with regard to both materials and labor, and which accordingly is then susceptible of low prices of sale to the consuming public, thereby making such telescopic conduit passage assembly economically available to the buying public.

Still yet another object of the present invention is to provide a new telescopic conduit passage assembly which provides in the apparatuses and methods of the prior art some of the advantages thereof, while simultaneously overcoming some of the disadvantages normally associated therewith.

Still another object of the present invention is to provide a new telescopic conduit passage assembly for extending conduit, such as electrical wiring, through a hole in an exterior wall of a structure.

Yet another object of the present invention is to provide a new telescopic conduit passage assembly which includes a main tube and an extension tube each having a pair of opposite open ends. A first of the ends of the extension tube is slidably inserted into a first of the ends of the main tube. The main tube and the extension tube each have an outwardly radiating end flange adjacent a second of the ends of the respective tube.

Still yet another object of the present invention is to provide a new telescopic conduit passage assembly that eliminates the need for users to run conduits through an exterior wall via gaps in a door or window.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic exploded side view of the present invention.

FIG. 3 is a schematic side view of the present invention in use in a wall structure.

FIG. 4 is a schematic end view of the present invention with conduit being extended therethrough.

DESCRIPTION OF THE PREFERRED EMBODIMENT

Figure 1:
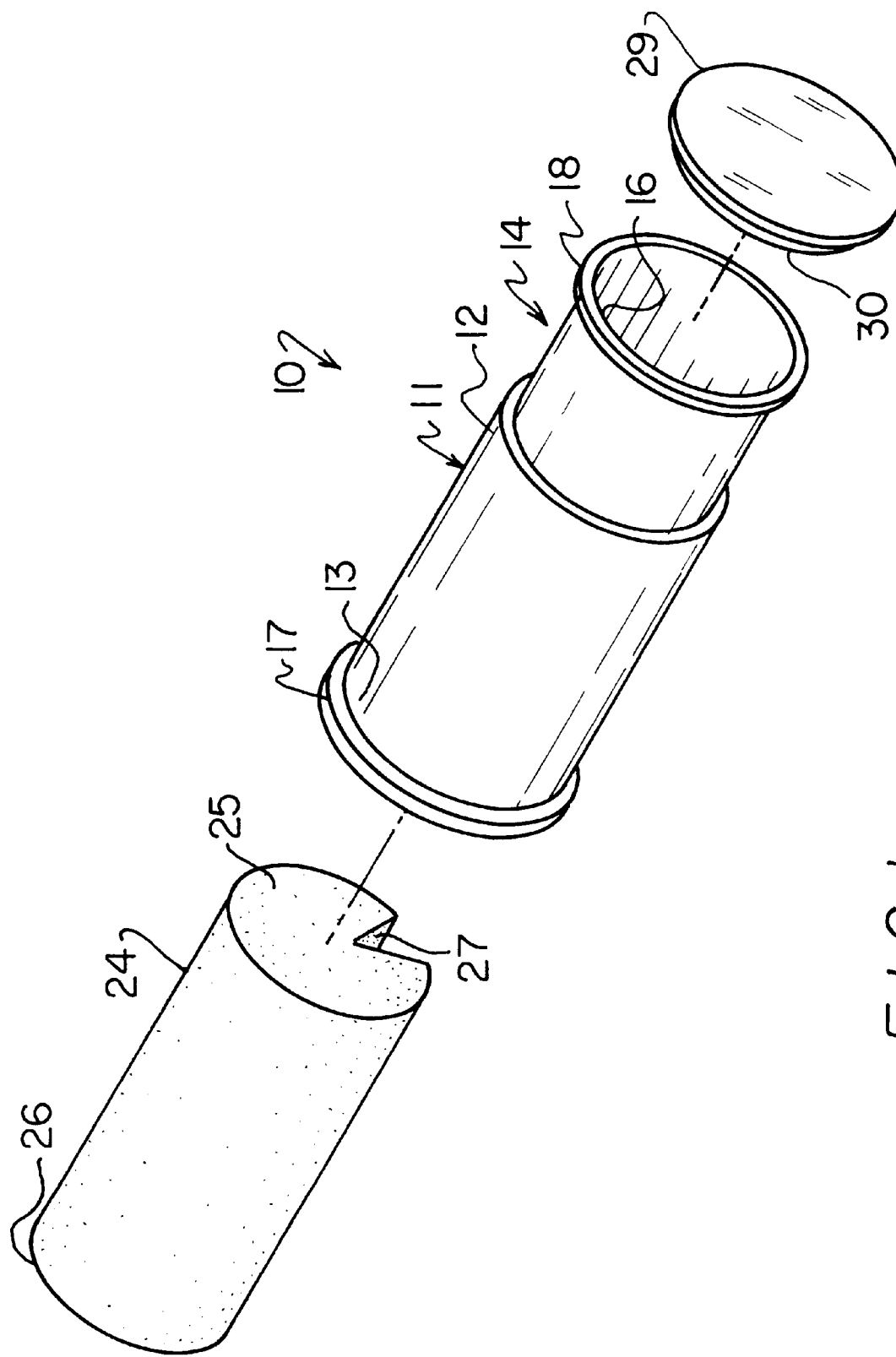
FIG. 1 is a schematic perspective view of a new telescopic conduit passage assembly according to the present invention.

With reference now to the drawings, and in particular to FIGS. 1 through 4 thereof, a new telescopic conduit passage assembly embodying the principles and concepts of the present invention and generally designated by the reference numeral 10 will be described.

As best illustrated in FIGS. 1 through 4, the telescopic conduit passage assembly 10 generally comprises a main tube and an extension tube each having a pair of opposite open ends. A first of the ends of the extension tube is slidably inserted into a first of the ends of the main tube. The main tube and the extension tube each have an outwardly radiating end flange adjacent a second of the ends of the respective tube.

In closer detail, the telescopic conduit passage assembly 10 comprises a generally cylindrical elongate main tube 11 having a pair of generally circular opposite open ends 12,13 and an axis extending between the ends of the main tube. A generally cylindrical elongate extension tube 14 is also provided having a pair of generally circular opposite open ends 15,16, and an axis extending between the ends of the extension tube.

A first of the ends of the extension tube is telescopically slidably inserted into a first of the ends of the main tube. The axes of the main tube and the extension tube are substantially coaxial with one another. The extension tube is slidable in and out of the main tube in directions parallel to the axis of the main tube.

The main tube and the extension tube each has inner and outer diameters defined substantially perpendicular to the axis of the respective tube. The inner diameter of the main tube is slightly larger than the outer diameter of the extension tube. In an ideal embodiment, the outer diameter of the main tube is about 2 inches. The main tube and the extension tube each have a length defined between the ends of the respective tube. The length of the main tube is greater than the length of the extension tube. In the ideal illustrative embodiment, the main tube has a length of about 8 inches to extend through most exterior walls with the extension tube permitting lengthening of the overall length of the assembly to more than 8 inches.

The main tube has an outwardly radiating annular end flange 17 adjacent a second of the ends of the main tube. Similarly, the extension tube has an outwardly radiating annular end flange 18 adjacent a second of the ends of the extension tube. The end flanges each have an outer diameter with the outer diameters of the end flanges each being greater than the outer diameter of the main tube and about equal to one another.

The assembly is designed for running conduit through a wall structure. In particular, the wall structure 19 has a generally cylindrical bore 20 therethrough extending between the exterior surfaces 21,22 of the wall structure. The bore has an inner diameter slightly greater than the outer diameter of the main tube and less than the outer diameters of either of the end flanges. The main tube and extension tube are extended through the bore of the wall structure. The end flange of the main tube abuts a first of the exterior surfaces facing outwards from the exterior of the structure and the end flange of the extension tube abuts a second of the exterior surfaces facing inwards into the interior of the structure. Ideally, an annular bead of sealant may be applied between each end flange and the adjacent exterior surface of the wall to form substantially water-tight seals between each end flange and the adjacent exterior surface.

Conduit 23 such as electrical wiring is extended through the passage defined by the main tube and the extension tube such that the conduit passed through the wall structure.

Preferably, a generally cylindrical elongate insulating insert 24 is provided having a pair of generally circular ends 25,26, and a generally V-shaped longitudinal channel 27 extending between the ends of the insert. The insert preferably comprises a resiliently deformable insulating material and ideally, a resiliently deformable foamed material. The insert is inserted into the passage defined by the main tube and the extension tube such that the insert is positioned between the second ends of the main tube and the extension tube. As best illustrated in FIG. 4, the conduit is positioned in the longitudinal channel of the insert. This way, the insert substantially closes the remainder of the passage to prevent drafts and moisture from passing through the passage during use.

A pair of generally disk shaped end caps 28,29 are also provided. One of the end caps is designed for substantially covering the second end of the main tube and the other of the end caps is designed for substantially covering the second end of the extension tube when conduit is not extended through the telescopic conduit passage assembly. The end caps prevent drafts and moisture from passing through the tubes when the assembly is not in use. Each of the end caps has a generally cylindrical plug 30 extending therefrom. Each plug is extended into the second end of the associated tube when the respective end cap is covering the second end of the associated tube.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An assembly for extending through a bore in a wall structure to permit running of conduit therethrough, said assembly comprising:
    a main tube having a smooth outer surface, a pair of opposite open ends and a longitudinal axis;
    an extension tube having a smooth outer surface, a pair of opposite open ends and a longitudinal axis;
    a first of said ends of said extension tube being inserted into a first of said ends of said main tube, said extension tube being axially slidable in a longitudinal direction with respect to said main tube for slidably adjusting the distance between a second of said ends of the extension tube and a second of the ends of the main tube;
    said main tube having an outwardly radiating end flange adjacent a second of said ends of said main tube; and
    said extension tube having an outwardly radiating end flange adjacent a second of said ends of said extension tube.

2. The assembly of claim 1, wherein said main tube and said extension tube are generally cylindrical.

3. The assembly of claim 1, wherein said main tube and said extension tube are substantially coaxial with one another.

4. The assembly of claim 1, further comprising a pair of end caps, one of said end caps being adapted for substantially covering said second end of said main tube, the other of said end caps being adapted for substantially covering said second end of said extension tube.

5. The assembly of claim 4, wherein each of said end caps has a plug extending therefrom, said plugs being extended into said second end of the associated tube when the respective end cap is covering the second end of the associated tube.

6. An assembly for extending through a bore in a wall structure to permit running of conduit therethrough, said assembly comprising:
    main tube having a pair of opposite open ends;
    an extension tube having a pair of opposite open ends;
    a first of said ends of said extension tube being slidably inserted into a first of said ends of said main tube;
    said main tube having an outwardly radiating end flange adjacent a second of said ends of said main tube;
    said extension tube having an outwardly radiating end flange adjacent a second of said ends of said extension tube;
    an insert leaving a pair of ends, and a longitudinal channel extending between said ends of said insert, said insert comprising a resiliently deformable material, said insert being inserted into said passage defined by said main tube and said extension tube such that said insert is positioned between said second ends of said main tube and said extension tube.

7. A telescopic conduit passage assembly system, comprising:
    a generally cylindrical elongate main tube having a pair of generally circular opposite open ends and an axis extending between said ends of said main tube;
    a generally cylindrical elongate extension tube having a pair of generally circular opposite open ends, and an axis extending between said ends of said extension tube;
    a first of said ends of said extension tube being slidably inserted into a first of said ends of said main tube, said axes of said main tube and said extension tube being substantially coaxial with one another, said extension tube being slidable in and out of said main tube in directions parallel to said axis of said main tube;
    said main tube and said extension tube each having inner and outer diameters defined substantially perpendicular to said axis of the respective tube;
    said inner diameter of said main tube being slightly larger than said outer diameter of said extension tube;
    said main tube and said extension tube each having a length defined between said ends of the respective tube;
    said length of said main tube being greater than said length of said extension tube;
    said main tube having an outwardly radiating annular end flange adjacent a second of said ends of said main tube;
    said extension tube having an outwardly radiating annular end flange adjacent a second of said ends of said extension tube;
    said end flanges each having an outer diameter, said outer diameters of said end flanges each being greater than said outer diameter of said main tube and being about equal to one another;
    said main tube and said extension tube defining a passage therethrough extending between said second ends of said tubes;
    a pair of generally disk shaped end caps, one of said end caps being adapted for substantially covering said second end of said main tube, the other of said end caps being adapted for substantially covering said second end of said extension tube;
    each of said end caps having a generally cylindrical plug extending therefrom, said plugs being extended into said second end of the associated tube when the respective end cap is covering the second end of the associated tube;
    a wall structure having a pair of exterior surfaces;
    said wall structure having a generally cylindrical bore therethrough extending between said exterior surfaces of said wall structure, said bore having an inner diameter slightly greater than said outer diameter of said main tube and less than said outer diameters of either of said end flanges;
    said main tube and extension tube being extended through said bore of said wall structure, said end flange of said main tube abutting a first of said exterior surfaces, said end flange of said extension tube abutting a second of said exterior surfaces;

wherein a sealant is provided between each end flange and the adjacent exterior surface of said wall to form substantially water-tight seals between each end flange and the adjacent exterior surface;

conduit being extended through said passage defined by said main tube and said extension tube such that said conduit passed through said wall structure;

a generally cylindrical elongate insert having a pair of generally circular ends, and a generally V-shaped longitudinal channel extending between said ends of said insert, said insert comprising a resiliently deformable foamed material; and said insert being inserted into said passage defined by said main tube and said extension tube such that said insert is positioned between said second ends of said main tube and said extension tube, said conduit being positioned in said longitudinal channel of said insert.

8. The assembly of claim 6, wherein said main tube and said extension tube are generally cylindrical.

9. The assembly of claim 6, wherein said main tube and said extension tube are substantially coaxial with one another.

10. The assembly of claim 6, further comprising a pair of end caps, one of said end caps being adapted for substantially covering said second end of said main tube, the other of said end caps being adapted for substantially covering said second end of said extension tube.

11. The assembly of claim 1, wherein each of said end caps has a plug extending therefrom, said plugs being extended into said second end of the associated tube when the respective end cap is covering the second end of the associated tube.

12. The assembly of claim 1, additionally comprising an insert having a pair of ends, and a longitudinal channel extending between said ends of said insert, said insert comprising a resiliently deformable material, said insert being inserted into said passage defined by said main tube and said extension tube such that said insert is positioned between said second ends of said main tube and said extension tube.

* * * * *